(12) United States Patent
Freeman (10) Patent No.: US 11,767,062 B2
(45) Date of Patent: Sep. 26, 2023

(54) VEHICLE PILLAR REINFORCEMENT USING ADDITIVE MANUFACTURING

(71) Applicant: Ford Global Technologies, LLC, Dearborn, MI (US)

(72) Inventor: Mike James Freeman, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 287 days.

(21) Appl. No.: 17/067,448

(22) Filed: Oct. 9, 2020

(65) Prior Publication Data

US 2022/0111906 A1     Apr. 14, 2022

(51) Int. Cl.
| | | |
|---|---|---|
| *B62D 25/04* | (2006.01) | |
| *B29C 64/135* | (2017.01) | |
| *B62D 27/02* | (2006.01) | |
| *B33Y 10/00* | (2015.01) | |
| *B33Y 70/00* | (2020.01) | |
| *B33Y 80/00* | (2015.01) | |

(52) U.S. Cl.
CPC ............ *B62D 25/04* (2013.01); *B29C 64/135* (2017.08); *B62D 27/02* (2013.01); *B33Y 10/00* (2014.12); *B33Y 70/00* (2014.12); *B33Y 80/00* (2014.12)

(58) Field of Classification Search
CPC ....... B62D 25/04; B62D 25/08; B62D 25/088
USPC ....................... 296/193.06, 29, 30
See application file for complete search history.

(56) References Cited

U.S. PATENT DOCUMENTS

| | | | |
|---|---|---|---|
| 5,855,407 A | 1/1999 | Fukuda | |
| 9,266,569 B1 | 2/2016 | Tew et al. | |
| 9,945,161 B2 * | 4/2018 | Iacovoni | ................. E05B 85/00 |
| 10,618,567 B2 | 4/2020 | Guariento | |

FOREIGN PATENT DOCUMENTS

| | | | | |
|---|---|---|---|---|
| JP | 4888702 B2 | | 2/2012 | |
| KR | 10-0833215 | * | 5/2008 | ............. B62D 25/04 |

* cited by examiner

*Primary Examiner* — Dennis H Redder
(74) *Attorney, Agent, or Firm* — Burris Law, PLLC (57) ABSTRACT

The present disclosure relates to reinforcing a vehicle pillar. The vehicle pillar includes a corner member and a reinforcement member. The reinforcement member is additively manufactured and may utilize functionally graded materials. The reinforcement member may be directly deposited on the corner member or may be manufactured separately and coupled thereafter to the corner member. The reinforcement member includes a first component, and a second component. Additionally, the reinforcement member may include a third component that extend angularly from the first and second component to form a Y-shaped structure. The reinforcement member can include multiple attachment joints that facilitate consolidating and coupling the reinforcement member with various vehicle components.

17 Claims, 9 Drawing Sheets

VEHICLE PILLAR REINFORCEMENT USING ADDITIVE MANUFACTURING

BACKGROUND

Technical Field

The present disclosure generally relates to reinforcement of a vehicle pillar using additive manufacturing.

Description of the Related Art

Vehicles typically include vertical supports, such as vehicle pillars. The vehicle pillars can support windscreens, roofs, and windows. The vehicle pillars are generally spaced in a fore-aft direction of the vehicle. For example, some vehicle pillars may include an A-pillar, a B-pillar, a C-pillar, and a D-pillar, arranged moving from a front of the vehicle to a rear of the vehicle. In vehicle pillars, joints can impact strength, rigidity, and load bearing capacity of the vehicle. In addition, joints of vehicle pillars can provide structural attachment to other components of the vehicle, for example liftgate hinges, roof racks, and liftgate cylinders. It is desirable to reinforce vehicle pillars to improve structural performance and torsional stiffness of the vehicle. Typically, various casting methods are used to manufacture reinforcement structures, such as a D-pillar cap reinforcement.

BRIEF SUMMARY

The present disclosure relates to additively manufactured reinforcement member. Additive manufacturing helps in reducing the overall weight of the reinforcement member and helps in consolidating various attachment points on the reinforcement member.

In one example, embodiment, a vehicle pillar includes a corner member, and a reinforcement element coupled to the corner member. The reinforcement element includes a first component, and a second component, where the first and second components are formed integrally as a single unit.

In one example embodiment, a vehicle pillar reinforcement includes a first component having a first attachment joint, and a second component having a second attachment joint, where the first and second components are formed as a single unit via an additive manufacturing process.

In one example embodiment, a method includes forming a plurality of components via an additive manufacturing process to define an integral reinforcement member, and reinforcing a vehicle pillar member with the reinforcement member.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1A:
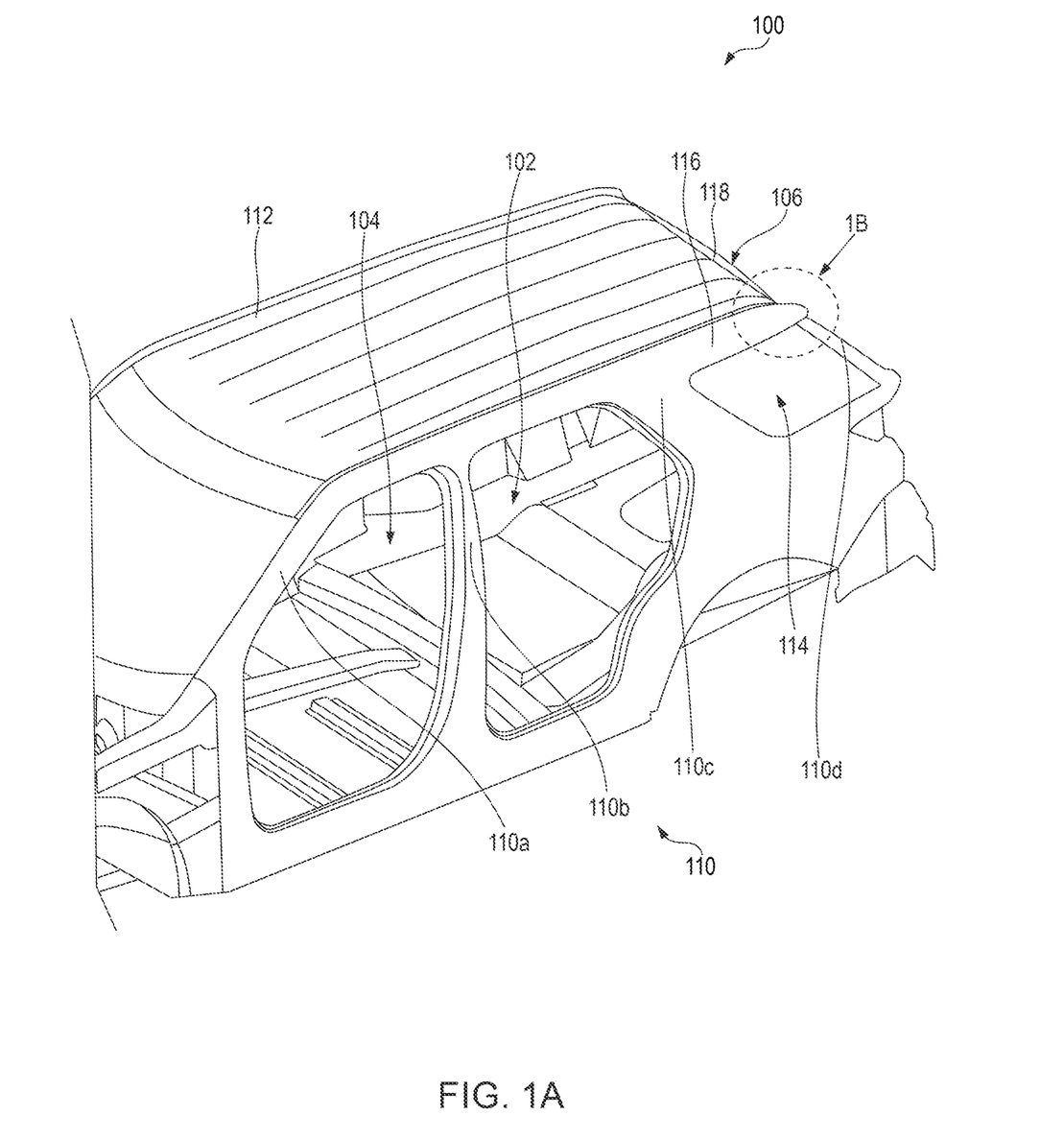
FIG. 1A is a perspective view of a vehicle body structure, according to an embodiment of the present disclosure.
Figure 1B:
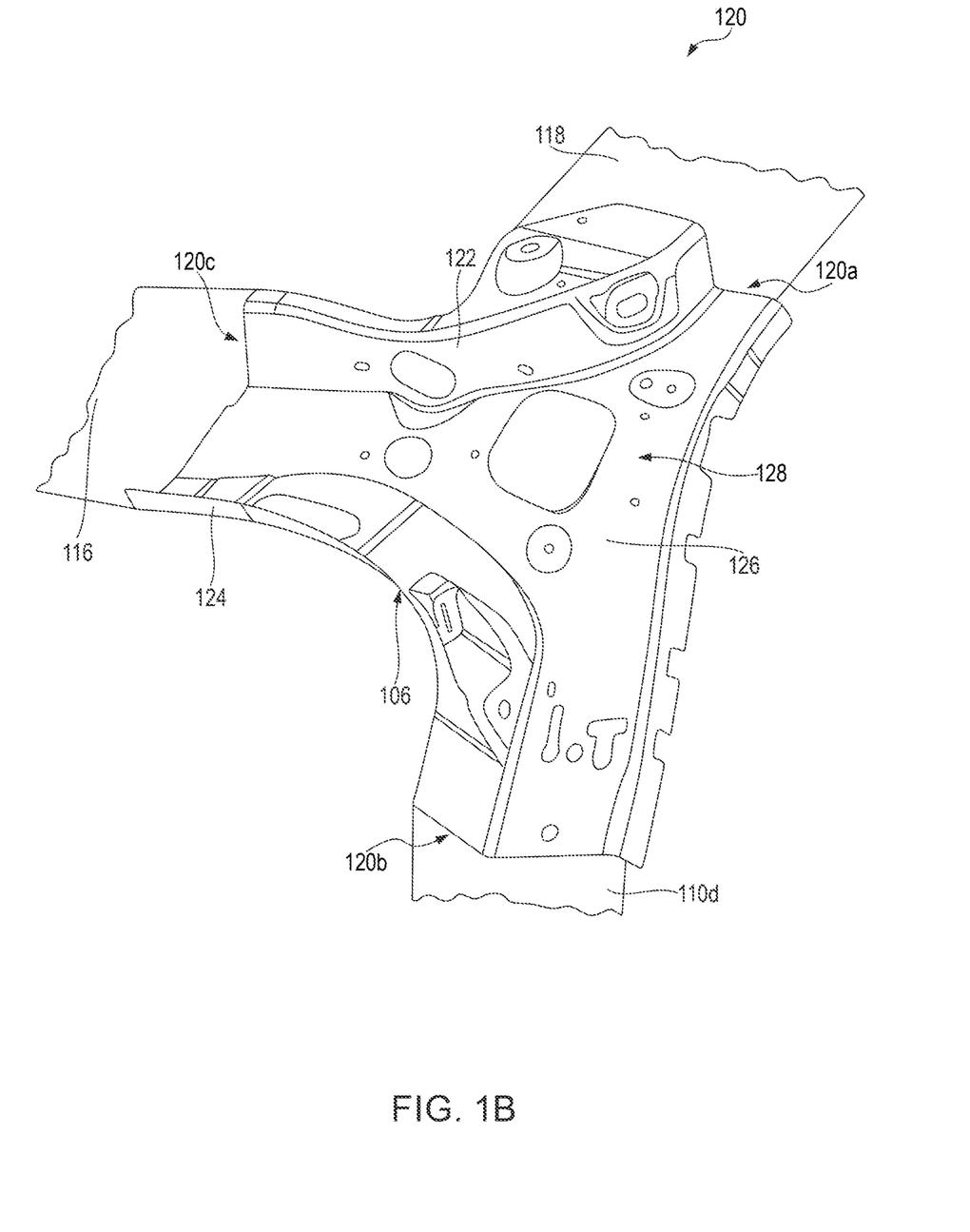
FIG. 1B is a detailed view of a corner member of the vehicle body structure of FIG. 1, according to an embodiment of the present disclosure.

FIGS. 1A and 1B illustrate a vehicle with vehicle pillars and an example corner member of one of the vehicle pillars. In particular, FIG. 1A illustrates a portion of a side of a vehicle body structure 100. Although not shown for the sake of clarity of illustration and description, an opposite side of the vehicle body structure 100 is generally similar to the one shown in FIG. 1A. The vehicle body structure 100 may be, for example, a Body-in-White (BIW) structure of a Sport Utility Vehicle (SUV), a Crossover Utility Vehicle (CUV), or any other vehicle having a liftgate. The vehicle body structure 100 includes a pair of rear door openings 102, a pair of front door openings 104, and a liftgate opening 106. The openings 102, 104 and 106 may each be sized to receive a suitable rear door, front door, and liftgate, respectively. The vehicle body structure 100 further includes a plurality of vehicle pillars regions 110 such as an A-pillar region 110a, a B-pillar region 110b, a C-pillar region 110c, and a D-pillar region 110d. While the illustrated vehicle body structure 100 is configured for a vehicle having four doors and one liftgate, it is contemplated that in embodiments with other configurations, the locations, presence, or number of doors and liftgate may be varied, changed, or omitted.

The vehicle body structure 100 includes a roof 112, a rear quarter window opening 114, a quarter window member 116, and a roof cross member 118. The rear quarter window opening 114 is sized and shaped to receive a rear quarter window (not shown for the sake of clarity of description and illustration). The quarter window member 116 extends along an upper portion of the rear quarter window opening 114, and between the C-pillar region 110c and the D-pillar region 110d. The roof cross member 118 extends along an upper portion of the liftgate opening 106 and between the D-pillar region 110d and the opposing D-pillar region (not shown for the sake of clarity of illustration and description). The D-pillar region 110d is positioned proximate to the liftgate opening 106 and the rear quarter window opening 114. The D-pillar region 110d further includes a corner member 120 (shown in FIG. 1B), described in detail below.

The corner member 120, shown in FIG. 1B, is formed via a suitable manufacturing process such as stamping, and is positioned at one end of the D-pillar region 110d, adjacent to the roof 112. The corner member 120 provides a rigid joining surface for the D-pillar region 110d with the roof cross member 118 and the quarter window member 116. The corner member 120 includes a first end 120a that couples to the roof cross member 118, a second end 120b that couples to the D-pillar region 110d, and a third end 120c that couples to the quarter window member 116. In the illustrated embodiment, the corner member 120 is coupled to the roof cross member 118, the D-pillar region 110d, and the quarter window member 116 via spot welding. Optionally, any other suitable coupling techniques and structures may be utilized such as, for example, fastening.

The corner member 120 further includes a first peripheral wall 122, a second peripheral wall 124 and a base plate 126. The first and second peripheral walls 122, 124 protrude away from the base plate 126 and define a substantially arcuate shape. In one example embodiment, the arcuate shape of the corner member 120 may be substantially congruent to a shape of a curved corner region of the liftgate opening 106. The arcuate shape formed by the first peripheral wall 122 and the second peripheral wall 124 defines a recess 128 that is sized and shaped to receive a reinforcement element or a reinforcement member (shown in FIGS. 2, 3, and 4 and described in more detail below), which is positioned on the base plate 126. In some embodiments, including embodiments described herein, the reinforcement element is fabricated via one or more additive manufacturing techniques to reduce overall weight of the reinforcement element. In some embodiments, the reinforcement member is manufactured separately and later coupled to the base plate 126 of the corner member 120.

In some embodiments, the corner member 120 may operate as a platform or substrate for directly manufacturing the reinforcement member onto the corner member 120. For example, in some embodiments, direct additive manufacturing may be used to fabricate the reinforcement member onto the corner member 120, which can provide manufacturing and assembly efficiencies, including improve part consolidation.

Figure 2:
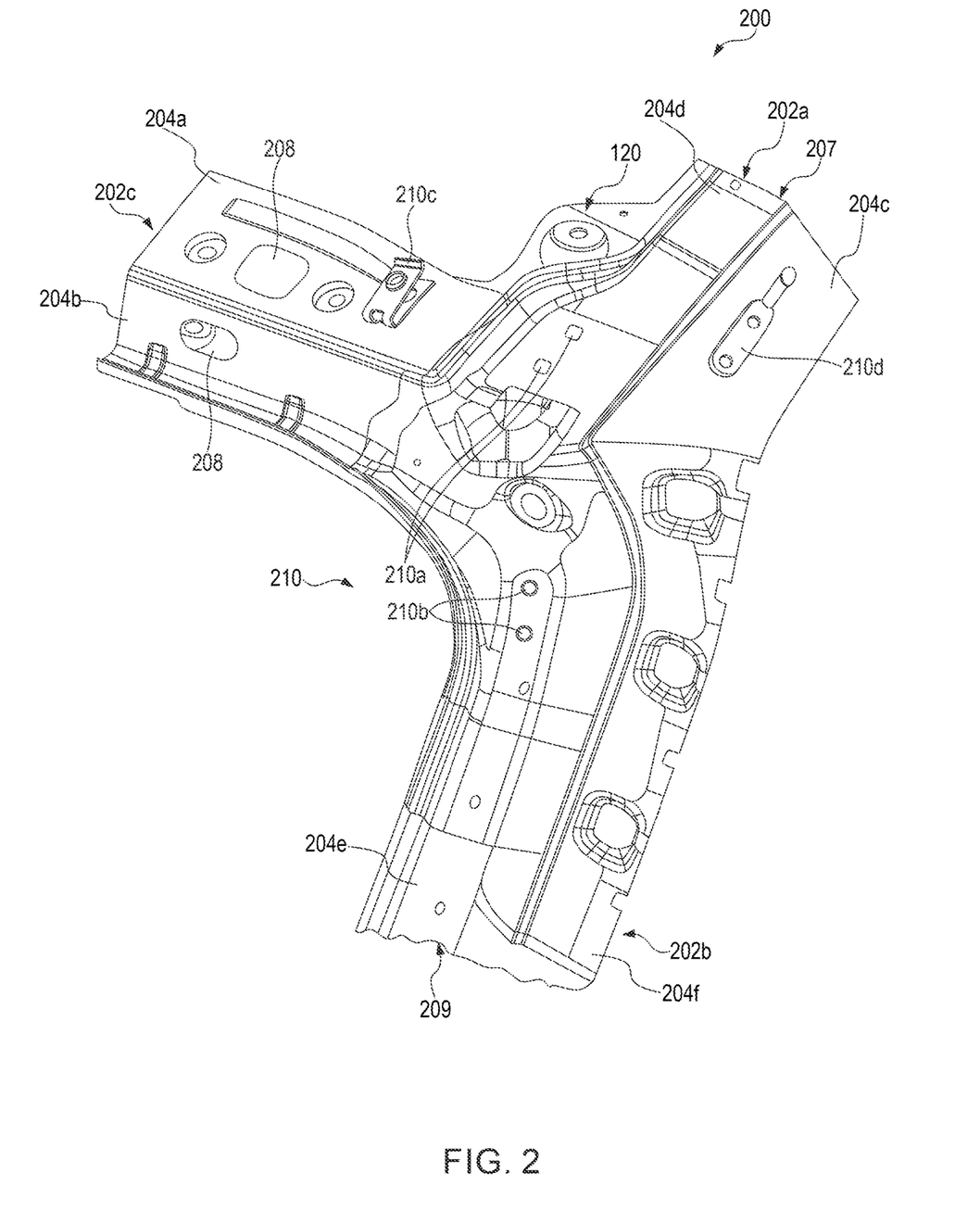
FIG. 2 is a top perspective view of a reinforcement member, according to an embodiment of the present disclosure, coupled to the corner member of FIG. 1B.
Figure 3:
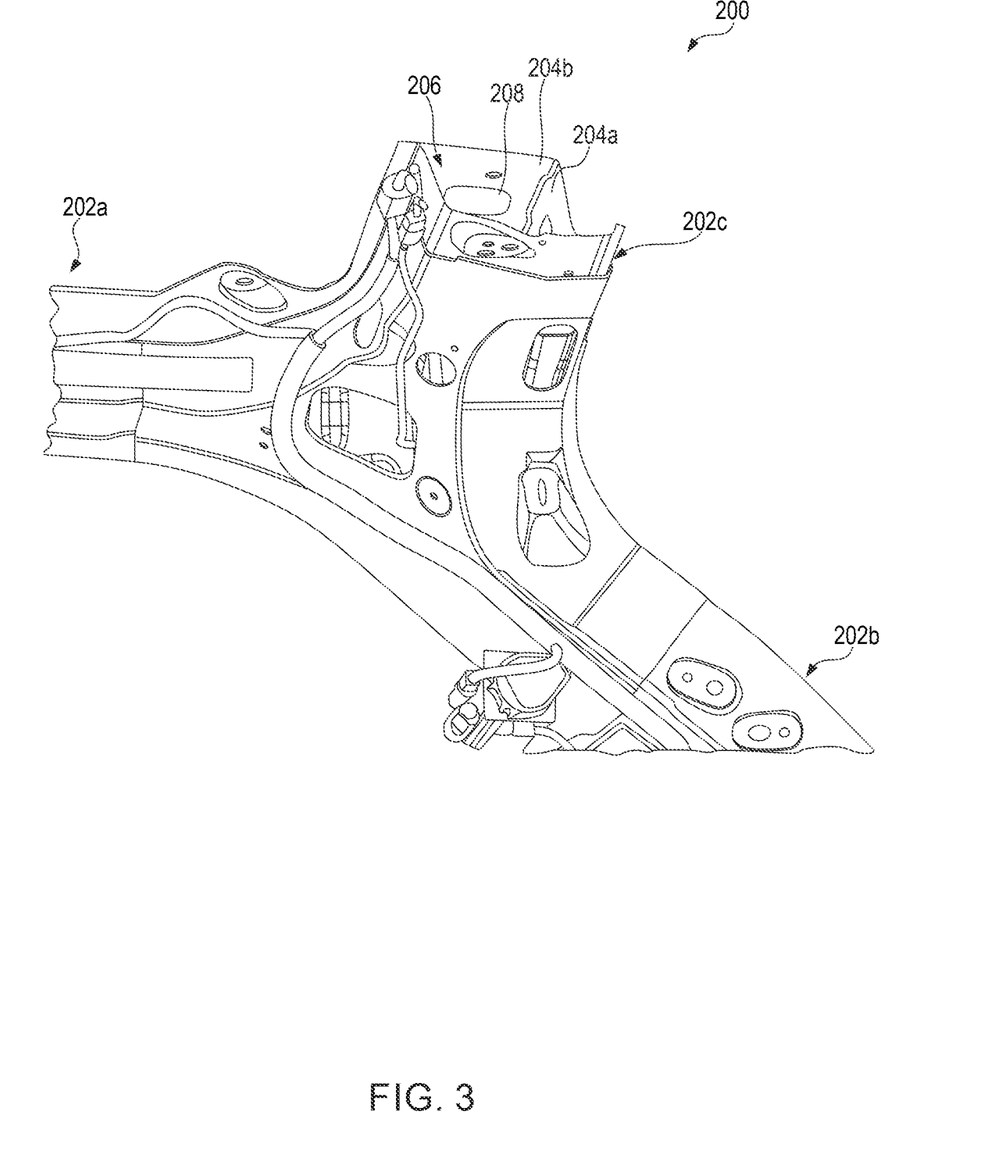
FIG. 3 is a bottom perspective view of the reinforcement member coupled to the corner member shown in FIG. 2.
Figure 4:
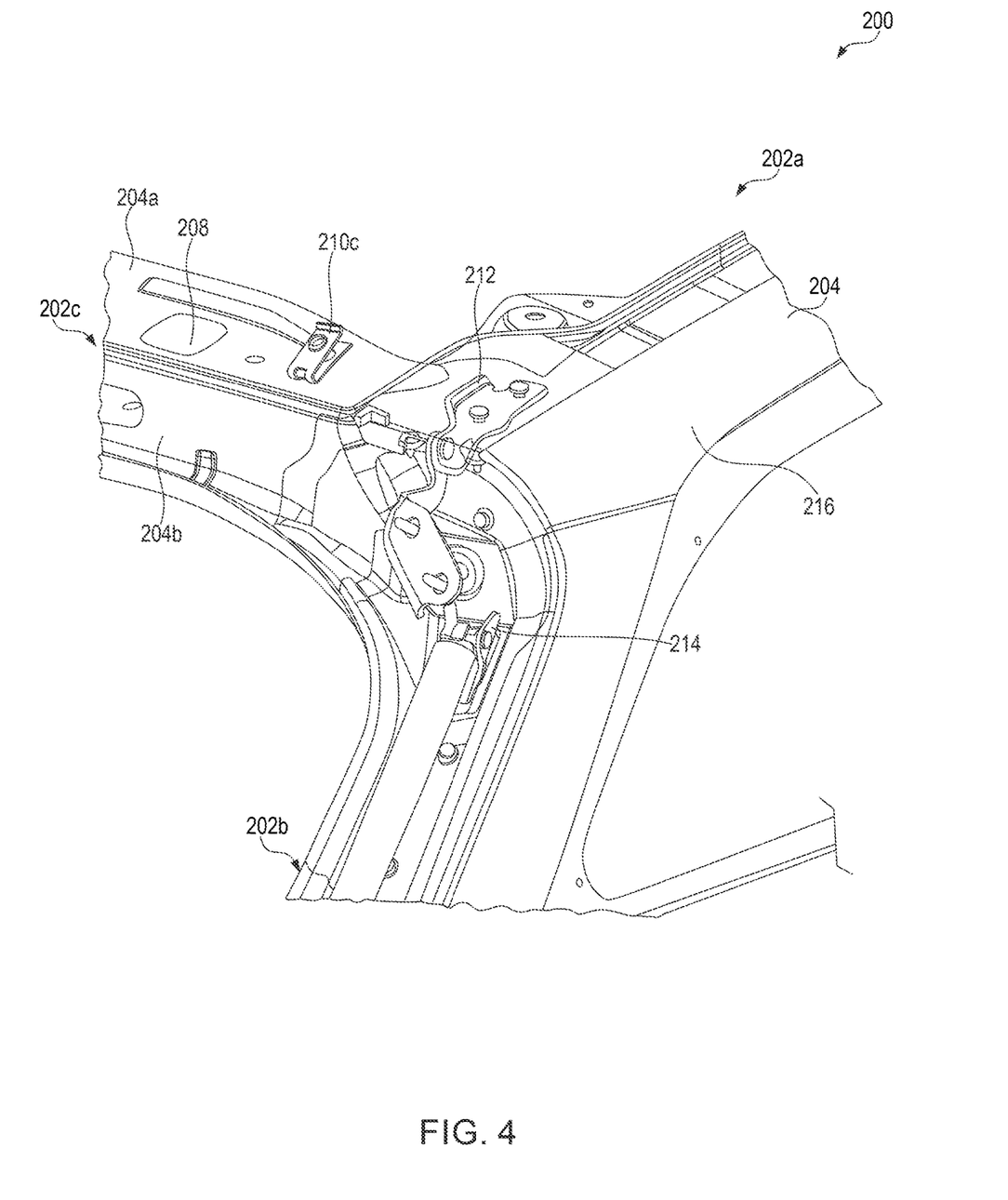
FIG. 4 is a top perspective view of the reinforcement member coupled to the corner member, illustrating various vehicle components coupled to the reinforcement member using a plurality of attachment joints, according to an embodiment of the present disclosure.

FIGS. 2 and 3 are isometric views of a reinforcement member 200 coupled to the corner member 120. FIG. 4 is an illustration of various vehicle components coupled to the D-pillar region 110d using various attachment joints of the reinforcement member 200.

As shown in FIG. 2, the reinforcement member 200 includes a first component 202a and a second component 202b. In one or more embodiments, the reinforcement member 200 also includes a third component 202c. The first component 202a, the second component 202b and the third component 202c (collectively referred to as components 202) are hollow tubular structures and are integrally formed as a single unit via one of the additive manufacturing processes described in more detail below. In the illustrated example embodiment, the first, second and third components 202a, 202b and 202c extend to the first, second and third ends 120a, 120b, and 120c of the corner member 120, respectively. As shown in FIGS. 2-4, the third component 202c extends angularly with respect to the first component 202a and the second component 202b. The first, second and third components 202a, 202b and 202c together form a "Y" shaped reinforcement member 200.

As shown in FIG. 3, the third component 202c includes walls 204a, 204b. The walls 204a, 204b define a periphery of the third component 202c of the reinforcement element 200 and are each angularly oriented to define a recess 206. Similarly, the first component 202a includes walls 204c, 204d, and the second component 202b also includes walls 204e, 204f. The walls 204c, 204d, 204e, 204f, again, define a periphery of each of the first and second components 202a, 202b and form respective recesses 207, 209.

The walls 204a-f (collectively referred to herein as walls 204) may also define one or more cavities or access openings 208. The access openings 208 may provide access to, for example, welding equipment, wires, or other components, such that these structures or components may extend through the first, second and third components 202a, 202b and 202c of the reinforcement member 200.

As shown in FIG. 2, the first component 202a, the second component 202b and the third component 202c include one or more joint elements 210a-d (also referred to as attachment joints 210) that protrude outwardly from outer surfaces of the first and second components 202a, 202b. The joint elements 210 provide attachment elements for coupling various vehicle parts to the reinforcement member 200.

FIGS. 2 and 4 illustrate in more detail, the coupling of the joint elements 210 to various vehicle components. For example, the first component 202a includes a first joint element 210a to couple the reinforcement member 200 to a hinge element 212. The second component 202b includes a second joint element 210b to couple the reinforcement member 200 to a strut 214.

The reinforcement member 200 includes additional joint elements, such as, for example, a clip 210c on the third component, and a hook 210d on the first component 202a. The hook 210d may couple with a quarter window cover 216. The clip 210c may couple to a roof cover (not shown for clarity of illustration and description). In some embodiments, the type and position of the joint elements 210 may be changed, added, omitted, or generally varied.

In contrast to typical D-pillar joints, in the embodiments described herein, a single reinforcement member 200 can be provided with integrally formed multiple attachment joint elements to couple to various parts of the vehicle body structure 100, which improves part consolidation.

Figure 5:
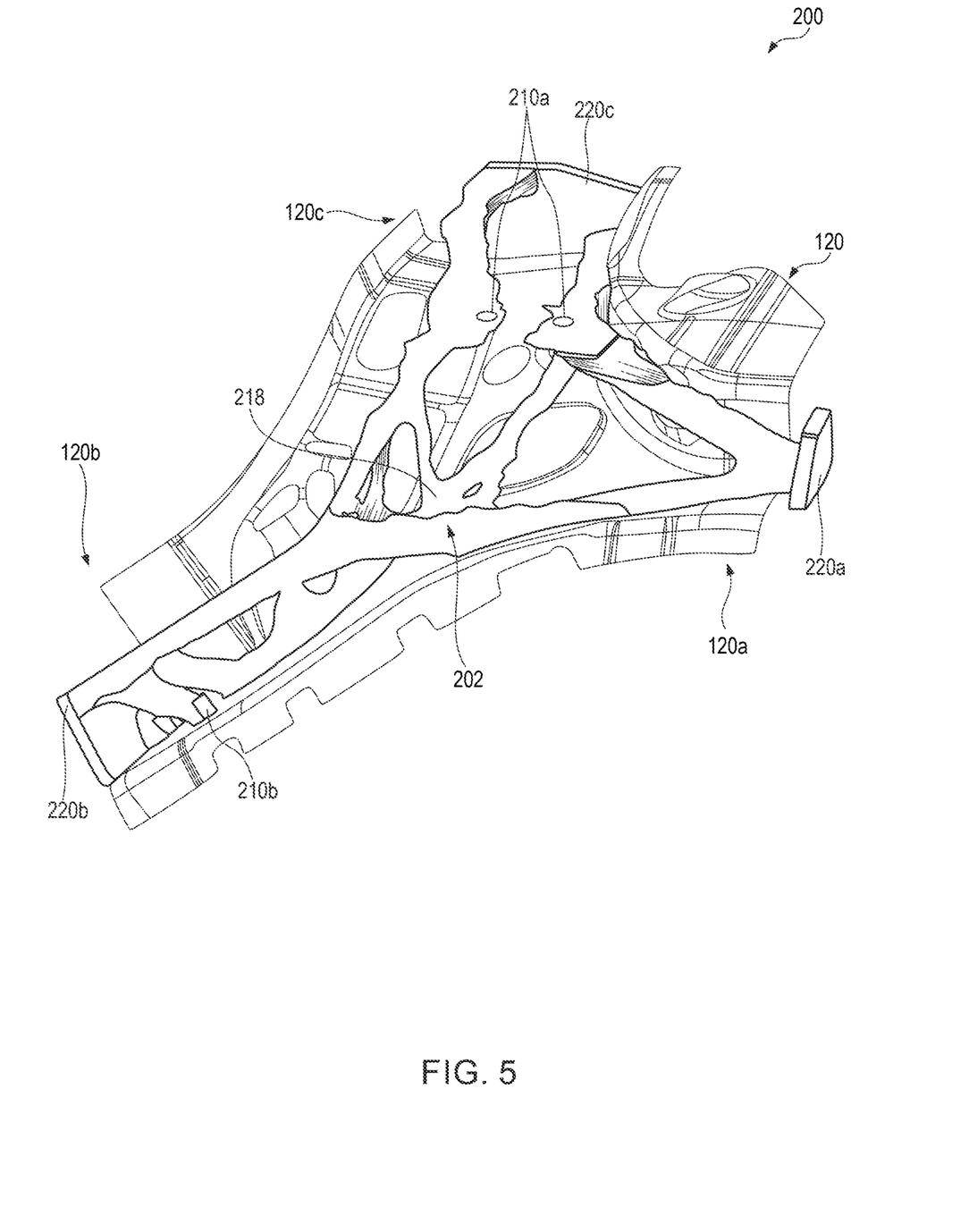
FIG. 5 is a top view of a reinforcement member of FIG. 2 formed via additive manufacturing, according to an embodiment of the present disclosure.
Figure 6:
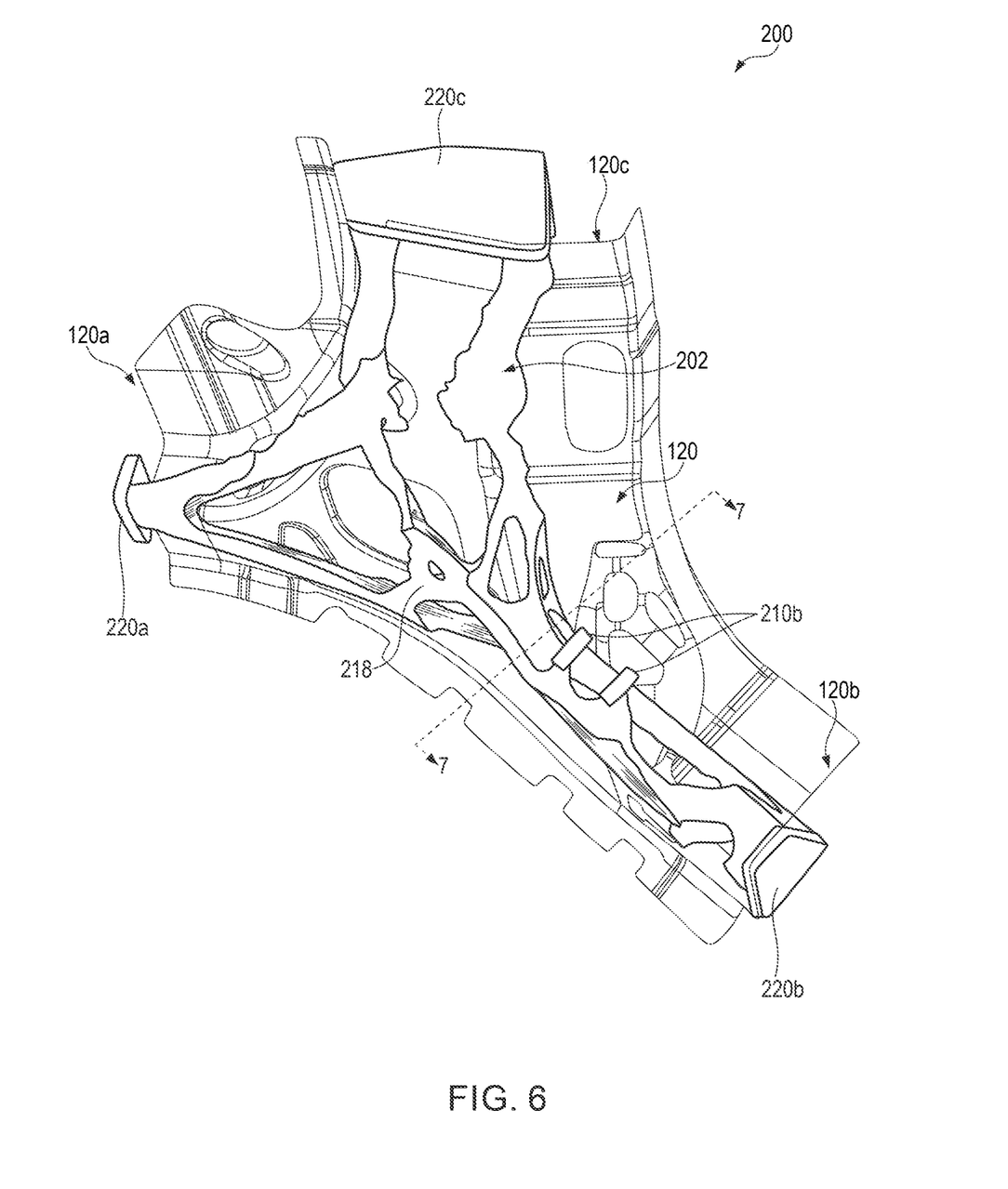
FIG. 6 is a bottom perspective view of the reinforcement member formed via additive manufacturing shown in FIG. 5.

The reinforcement member 200, according to the present disclosure, is manufactured directly on a member of the vehicle pillar 110 such as the corner member 120, as described in conjunction with FIGS. 5 and 6. Specifically, the reinforcement member 200 is manufactured directly onto the base plate 126 of the corner member 120 using at least one of an additive manufacturing technique or process, such as, for example, laser direct energy deposition. In some embodiments, the reinforcement member 200, may alternatively, be manufactured separately using at least one of an additive manufacturing (AM) process, such as, for example, material extrusion, 3-D printing, material jetting, powder bed fusion, Directed Energy Deposition (DED) and later coupled to the corner member 120 using any suitable coupling structures. In an embodiment, where metal extrusion process is used to manufacture the reinforcement member 200, a material in a filament form can be drawn through a nozzle, heated and then extruded and deposited onto the build platform in a layer-by-layer process. In an embodiment, metal extrusion 3D printers can be used to manufacture the reinforcement member 200. The metal extrusion 2D printer may be cartesian type 3D printer, where the nozzle may move in an X, Y direction, whereas a build platform may move in a Z-direction.

In an embodiment, where material jetting process is used to manufacture the reinforcement member 200, a material in the form of liquid droplets may be dispensed from multiple printheads. The material may comprise photosensitive polymer, which hardens on exposure to UV light to build the reinforcement member 200 layer-by-layer.

In an embodiment, where powder bed fusion process is used to manufacture the reinforcement member, the process may use a laser or an electron beam to sinter, melt and fuse the powder particles together while tracing a cross-section of the reinforcement member 200. On completion of a first layer, the powder dispensing unit may spread a new layer of powder onto the build platform and the printing may continue for subsequent layers, until the reinforcement member 200 is manufactured.

In an embodiment, where DED process is used to manufacture the reinforcement member 200, a nozzle may hold a material in a wire form, also referred to as a feed, which moves across multiple axes. An electron beam projector may melt the feed as the electron beam projector moves across while tracing geometry of the reinforcement member 200.

As noted above, the reinforcement member 200 may be later coupled to the corner member 120 using any suitable coupling structures. For example, the reinforcement member 200 may be coupled to the base plate 126 and positioned in the recess 128 of the corner member 120 via welding, fastening, or other suitable coupling structures.

Figure 7:
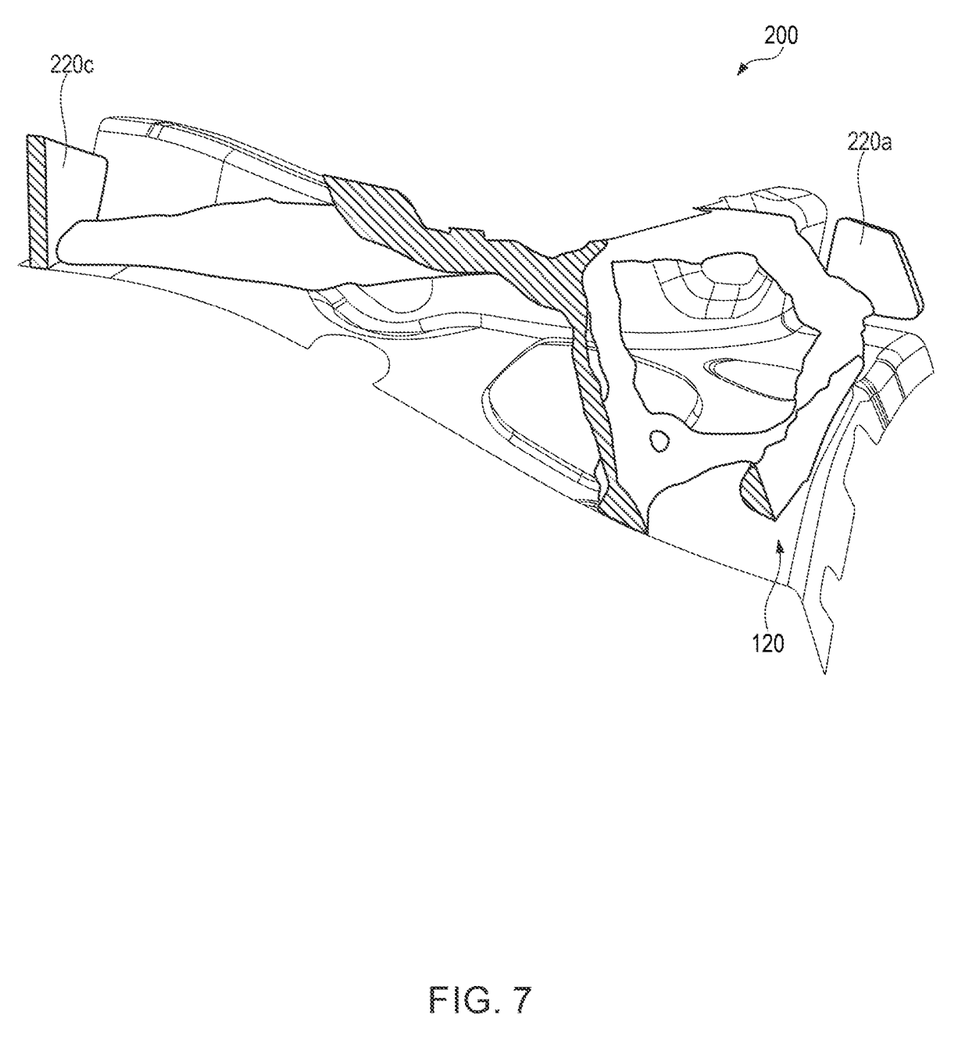
FIG. 7 is a cross sectional view of the reinforcement member formed via additive manufacturing shown in FIG. 5.

FIGS. 5, 6, and 7 illustrate detailed views of the reinforcement member 200 as it is being formed via additive manufacturing. As shown in FIGS. 5-7, the plurality of components 202 of the reinforcement member 200 are manufactured as an integral part of the reinforcement member 200 and configured to integrally form the attachment joints 210a, and 210b. Referring to FIGS. 5 and 6, the design and pattern of the plurality of components 202 include elements of biomimicry to form a biomimicry mesh 218 for load path optimization. The reinforcement member 200 is manufactured directly on the corner member 120, using one of the additive manufacturing processes, such as directed energy deposition (DED), wire fed arc weld, powder-laser directed energy deposition, or cold spray.

In an embodiment where the DED process is used to manufacture the reinforcement member 200 directly on the corner member 120, as described above, a nozzle holds a material in a wire form, which is known as a feed, which moves across multiple axes, and an electron beam projector melts the feed as the electron beam projector moves across while tracing the object geometry.

In an embodiment where the wire fed arc weld process is used to manufacture the reinforcement member 200, an arc welding process is used to 3D print a metallic reinforcement member 200. In the wire fed arc weld process, a metal wire may be melted using an electric arc as a heat source.

In an embodiment where the cold spraying additive manufacturing is used to manufacture the reinforcement member 200, the reinforcement member 200 is built on the corner member 120, for example. During this process, fine powder particles are accelerated in a high velocity compressed gas stream, and upon the impact on a substrate or backing plate, deform and bond together creating a layer. Moving the nozzle over a substrate repeatedly, a deposit is built layer-by-layer, to form the reinforcement member 200 on the corner member 120.

In an embodiment where the powder-laser directed energy deposition process is used to manufacture the reinforcement member 200, a laser beam may form a melt pool on a metallic substrate, into which powder is fed. The powder is thereafter melted to form a deposit that is fusion bonded to the substrate. In this embodiment, the substrate can take the form of the corner member 120 and the powder may comprise stainless steel to form the reinforcement member 200 on the corner member 120.

In one embodiment, the reinforcement member 200 and the integrally formed plurality of components 202 are manufactured via functionally graded additive manufacturing (FGAM) using a functionally graded material (FGM). The functionally graded materials (FGM) can comprise composite materials with gradual variations in their compositions and structures throughout their volume. FGM can be selected to develop gradient components with specific graded properties at different locations.

In one example, the FGM includes a first material and a second material. The first material and second material can have different density gradients, e.g., properties of the first and second materials can be different. Further, in one embodiment, the first material is fused with the second material to generate a dynamic gradient. The reinforcement member 200 and the integrally formed plurality of components 202 manufactured using the dynamic gradient may incorporate at least one of a compositional gradient or a densification gradient. Thus, the reinforcement member 200 and the integrally formed plurality of components 202 can have variable properties at different locations. For example, a portion of the plurality of components 202 may be configured to have a higher compositional gradient or a densification gradient at select locations requiring higher torsional stiffness, while another portion of the plurality of components 202 may have a lower compositional gradient or a densification gradient which experience less torsional stresses.

As shown in FIGS. 5-7, as the reinforcement member 200 is formed via additive manufacturing, the plurality of components 202 include three end members 220a, 220b and 220c. The end members 220a, 220b and 220c are located at the three ends of the first, second and third components 202a, 202b and 202c, respectively of the plurality of components 202. The end members 220a, 220b and 220c are perpendicular to the biomimicry mesh 218 of the plurality of components 202, and may act as platforms or supports for manufacturing the plurality of components 202. Again, as shown in FIGS. 2-4, upon forming of the reinforcement member 200 via one or more of the additive manufacturing processes described herein, the reinforcement member 200 will include integrally formed plurality of components 202 and joint elements. Further, as described above, in some embodiments, the material of additive manufacturing may comprise stainless steel or FGM. In some embodiments, the material of additive manufacturing may comprise high-strength steel, titanium, composites, aluminum, for example.

Figure 8:
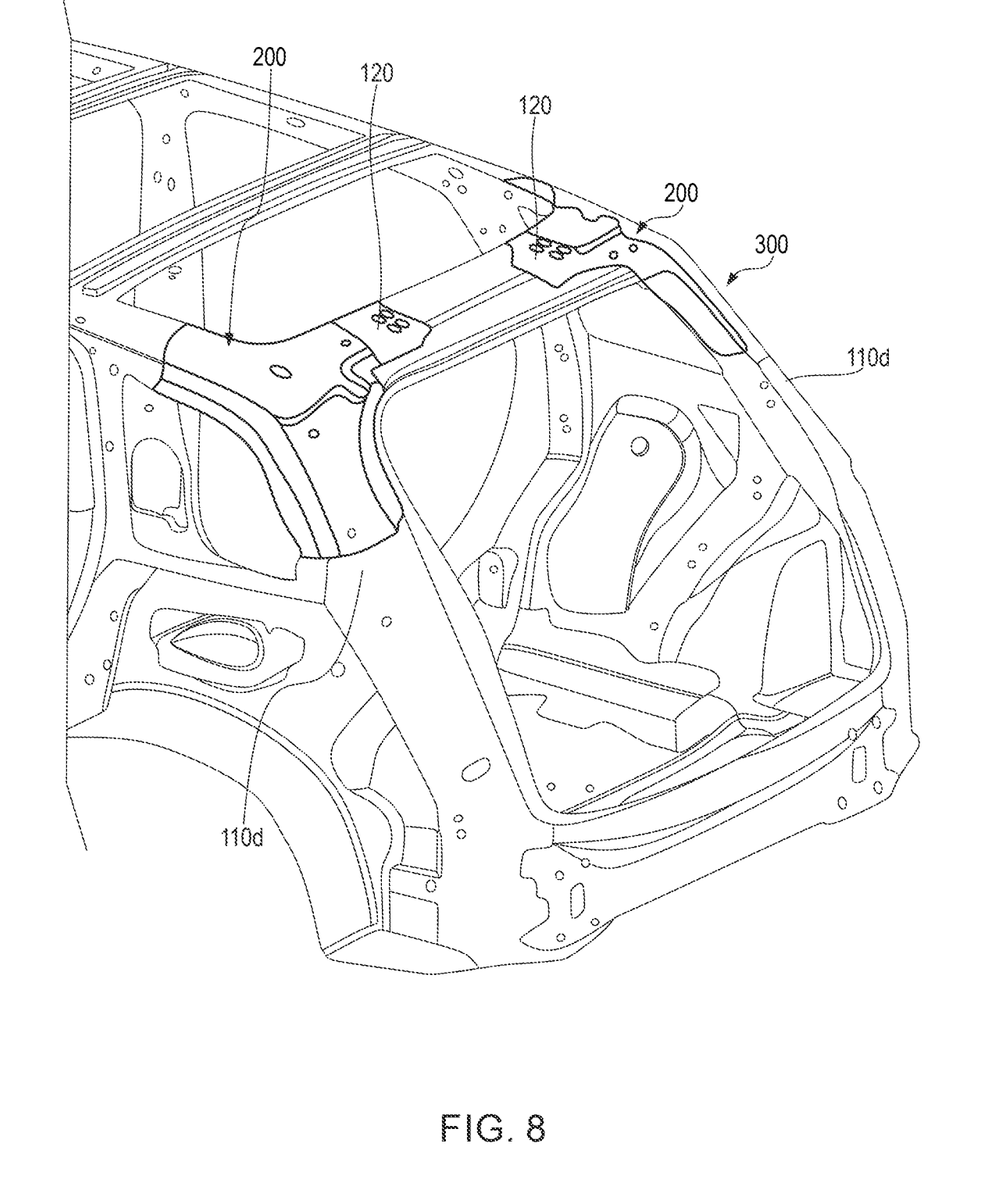
FIG. 8 is a top perspective view of a vehicle pillar reinforcement coupled to a vehicle pillar, according to an embodiment of the present disclosure.

FIG. 8 illustrates the reinforcement member 200 formed directly on the corner member 120 of the D-pillar region 110d of a vehicle 300 by using one or more of the additive manufacturing processes described herein.

As described above, the reinforcement member 200 can be formed via directly depositing an additive manufacturing material on corner member 120. In some embodiments, the additive manufacturing can include depositing a combination of two or more materials, for example, a functionally graded material. The functionally graded material can include a first material and a second material, where the first material can have a variable density gradient. The first material can be fused with the second material to generate a dynamic gradient. The dynamic gradient can include at least one of a compositional gradient or a densification gradient. In some embodiments, the dynamic gradient of the functionally graded material can be varied, for example, to improve load path optimization when depositing on the corner member 120. Again, in this manner, a plurality of components, e.g., components 202, can be formed integrally, with any desired number of joint elements, e.g., joint elements 210.

Although in the example embodiments described above, the reinforcement member 200 or the vehicle pillar reinforcement 200 is coupled to a corner member 120 of the D-pillar region 110d, in other embodiments, reinforcement members or other coupling members or structures can be integrally formed with any of the vehicle pillars 110 (e.g., the A-pillar region 110a, the B-pillar region 110b, and the C-pillar region 110c) via one or more of the additive manufacturing processes described herein. Further, in some embodiments, the one or more of additive manufacturing processes may be used to consolidate two or more vehicle components by integrally forming the two or more vehicle components. Moreover, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vehicle pillar, comprising:
a corner member; and
a reinforcement element coupled to the corner member, the reinforcement element including:
a first component; and
a second component, the first and second components formed integrally as a single unit,
wherein each of the first component and the second component includes at least one integral joint element configured to secure at least one of a hinge element and a strut to the reinforcement element,
wherein the first component and the second component are integrally formed via an additive manufacturing process, and
wherein the first and second components comprise a functionally graded material that is deposited on the corner member via the additive manufacturing process.

2. The vehicle pillar of claim 1 wherein the corner member includes a first peripheral wall, and a second peripheral wall, the first and second peripheral walls defining a recess that is sized and shaped to receive the reinforcement element.

3. The vehicle pillar of claim 1 wherein the reinforcement element includes one or more cavities that provide wiring access.

4. The vehicle pillar of claim 1 wherein the first and second components comprise stainless steel that is deposited on the corner member via the additive manufacturing process.

5. The vehicle pillar of claim 1 wherein the functionally graded material includes a first material having a variable density gradient.

6. The vehicle pillar of claim 1 wherein the functionally graded material includes a first material and a second material.

7. The vehicle pillar of claim 6 wherein the first material is fused with the second material to generate a dynamic gradient.

8. The vehicle pillar of claim 7 wherein the dynamic gradient includes at least one of a compositional gradient or a densification gradient.

9. The vehicle pillar of claim 1, wherein the reinforcement element comprises a third component formed integrally with the first and second components.

10. The vehicle pillar of claim 9, wherein the third component is a hollow tubular structure.

11. The vehicle pillar of claim 9, wherein third component includes an integral joint element configured to secure a vehicle part to the reinforcement element.

12. The vehicle pillar of claim 11, wherein the integral joint element of the third component is a clip.

13. The vehicle pillar of claim 9, wherein the corner member includes a first peripheral wall, and a second peripheral wall, the first and second peripheral walls defining a recess that is sized and shaped to receive the reinforcement element.

14. The vehicle pillar of claim 9, wherein the first, second, and third components are integrally formed via an additive manufacturing process.

15. The vehicle pillar of claim 1, wherein the first component includes at least two integral joint elements.

16. The vehicle pillar of claim 15, wherein one of the at least two integral joint elements of the first component is a hook.

17. A vehicle pillar, comprising:
a corner member; and
a reinforcement element coupled to the corner member, the reinforcement element including:
a first component; and
a second component, the first and second components formed integrally as a single unit,
wherein the first component and the second component are integrally formed via an additive manufacturing process, and
wherein the first and second components comprise a functionally graded material that is deposited on the corner ember via the additive manufacturing process.

* * * * *